(12) United States Patent
Bian et al.

(10) Patent No.: US 12,306,442 B2
(45) Date of Patent: May 20, 2025

(54) STRUCTURE INCLUDING GRATING COUPLER WITH OPTOFLUIDIC GRATING CHANNELS

(71) Applicant: GlobalFoundries U.S. Inc., Malta, NY (US)

(72) Inventors: Yusheng Bian, Ballston Lake, NY (US); Vibhor Jain, Clifton Park, NY (US); Steven M. Shank, Jericho, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 246 days.

(21) Appl. No.: 17/816,790

(22) Filed: Aug. 2, 2022

(65) Prior Publication Data

US 2024/0045156 A1 Feb. 8, 2024

(51) Int. Cl.
*G02B 6/34* (2006.01)
*B01L 3/00* (2006.01)
(Continued)

(52) U.S. Cl.
CPC .............. *G02B 6/34* (2013.01); *B01L 3/5027* (2013.01); *B01L 3/502715* (2013.01); *G01N 21/41* (2013.01); *G01N 21/4133* (2013.01); *G01N 21/4788* (2013.01); *G01N 21/6428* (2013.01); *G02B 6/4212* (2013.01);
(Continued)

(58) Field of Classification Search
CPC ...... G02B 6/34; G02B 6/4212; G02B 6/4215; G02B 6/4274; G02B 6/4295; G02B 6/124; G02B 2006/12138; B01L 3/5027; B01L 3/502715; B01L 2300/0627; B01L 2300/0654; B01L 2300/0819;
(Continued)

(56) References Cited

U.S. PATENT DOCUMENTS 6,719,868 B1 * 4/2004 Schueller ........... G01N 21/4788
156/292
7,248,771 B2 7/2007 Schmidt et al.
(Continued)

FOREIGN PATENT DOCUMENTS

CA 2039526 A * 10/1991 ............. G02B 6/124
CN 106959370 B * 12/2018 ......... G01N 21/6428
(Continued)

OTHER PUBLICATIONS

Machine Translation of Chen, Duan-Jun (TW 558635 B) (Year: 2003).*
(Continued)

*Primary Examiner* — Michelle R Connelly
(74) *Attorney, Agent, or Firm* — Francois Pagette; Hoffman Warnick LLC

(57) ABSTRACT

A structure includes a dielectric waveguide, and at least one grating coupler adjacent the dielectric waveguide. Each grating coupler includes a set of parallel optofluidic grating channels oriented orthogonally to the dielectric waveguide. The structure may also include a radiation source operatively coupled to the dielectric waveguide, and an optical receiver such as a photosensor adjacent the grating coupler(s). The structure may be used as part of an optofluidic sensor system for, for example, biochemical applications.

20 Claims, 10 Drawing Sheets

(51) Int. Cl.
| | |
|---|---|
| *G01N 21/41* | (2006.01) |
| *G01N 21/47* | (2006.01) |
| *G01N 21/64* | (2006.01) |
| *G01N 21/77* | (2006.01) |
| *G02B 6/12* | (2006.01) |
| *G02B 6/124* | (2006.01) |
| *G02B 6/42* | (2006.01) |

(52) U.S. Cl.
CPC ......... *G02B 6/4215* (2013.01); *G02B 6/4274* (2013.01); *G02B 6/4295* (2013.01); *B01L 2300/0627* (2013.01); *B01L 2300/0654* (2013.01); *B01L 2300/0819* (2013.01); *G01N 2021/7786* (2013.01); *G01N 2201/08* (2013.01); *G02B 2006/12138* (2013.01); *G02B 6/124* (2013.01)

(58) Field of Classification Search
CPC .............. G01N 21/41; G01N 21/4133; G01N 21/4788; G01N 21/6428; G01N 2021/7786; G01N 2201/08
See application file for complete search history.

(56) References Cited

U.S. PATENT DOCUMENTS

| | | | |
|---|---|---|---|
| 8,994,946 B2 | 3/2015 | McCaffrey et al. | |
| 10,585,245 B1 | 3/2020 | Bian et al. | |
| 10,816,872 B1 | 10/2020 | Bian et al. | |
| 10,895,689 B2 | 1/2021 | Bian et al. | |
| 11,287,719 B2 | 3/2022 | Bian | |
| 2003/0020915 A1* | 1/2003 | Schueller | B01L 3/5027 430/1 |
| 2008/0159351 A1* | 7/2008 | Li | H01S 3/213 372/20 |
| 2017/0016827 A1* | 1/2017 | Gervais | G01N 21/648 |
| 2021/0278742 A1 | 9/2021 | Bian et al. | |
| 2022/0062896 A1 | 3/2022 | Shank et al. | |

FOREIGN PATENT DOCUMENTS

| | | | | |
|---|---|---|---|---|
| CN | 111208069 A | * | 5/2020 | |
| EP | 2916125 A1 | * | 9/2015 | ........ B01L 3/502715 |
| EP | 3114461 B1 | * | 12/2022 | ........ B01L 3/502715 |
| TW | 558635 B | * | 10/2003 | |
| TW | 201432243 A | * | 8/2014 | |
| WO | WO-0102839 A1 | * | 1/2001 | ............. B82Y 20/00 |
| WO | WO-2008121250 A1 | * | 10/2008 | ............. B01L 3/5085 |

OTHER PUBLICATIONS

Machine Translation of Fang et al. (CN 106959370B) (Year: 2018).*
Machine Translation of Chen et al. (CN 111208069 A1) (Year: 2020).*
Chiang et al., Machine Translation of TW-201432243-A, Aug. 16, 2014. (Year: 2014).*
Aboketaf et al., "Towards fully automated testing and characterization for photonic compact modeling on 300-mm wafer platform," W6A.1, OFC 2021, OSA 2021, 3 pages.
Bian et al., "3D Integrated Laser Attach Technology on 300-mm Monolithic Silicon Photonics Platform," 978-1-7281-5891-4/20, IEEE 2020, 2 pages.
Bian et al., "Towards low-loss monolithic silicon and nitride photonic building blocks in state-of-the-art 300mm CMOS foundry," FW5D. 2, Frontiers in Optics, Laser Science, OSA 2020, 2 pages.
Bian et al., "Monolithically integrated silicon nitride platform," Th1A.46, OFC 2021, OSA 2021, 3 pages.
Bian et al., "Hybrid III-V laser integration on a monolithic silicon photonic platform," M5A.2, OFC 2021, OSA 2021, 3 pages.
Giewont et al., "300-mm Monolithic Silicon Photonics Foundry Technology," IEEE Journal of Selected Topics in Quantum Electronics, 25:8200611, Sep./Oct. 2019, 11 pages.
Peng et al., A CMOS Compatible Monolithic Fiber Attach Solution with Reliable Performance and Self-Alignment, Th31.4, OFC 2020, OSA 2020, 3 pages.
Rahman et al., "On demand delivery and analysis of single molecules on a programmable nanopore-optofluidic device," Nature Communications, 10:3712, 2019, 7 pages.
Rakowski et al., "45nm CMOS—Silicon Photonics Monolithic Technology (45CLO) for next-generation, low power and high speed optical interconnects," T3H.3, OFC 2020, OSA 2020, 3 pages.
Reccius et al., "Conformation, Length, and Speed Measurements of Electrodynamically Stretched DNA in Nanochannels," Bioplysical Journal, 95:273-286, Jul. 2008, 14 pages.
Schmidt et al., "Integrated ARROW waveguides for gas/liquid sensing," Proceedings of SPIE, Optical Science and Technology, the SPIE 49th Annual Meeting, Oct. 2004, 15 pages.
Testa et al., "Liquid Core ARROW Waveguides: A Promising Photonic Structure for Integrated Optofluidic Microsensors," Micromachines, 7:47, 2016, 19 pages.
Turker et al., "Grating Coupler Integrated Photodiodes for Plasmon Resonance Based Sensing in Fluidic Systems," Optical Society of America, OSA/CLEO 2011, CMX4, 2 pages.
U.S. Appl. No. 17/195,887, filed Mar. 9, 2021, entitled Device Including Optofluidic Sensor with Integrated Photodiode, 58 pages.

* cited by examiner

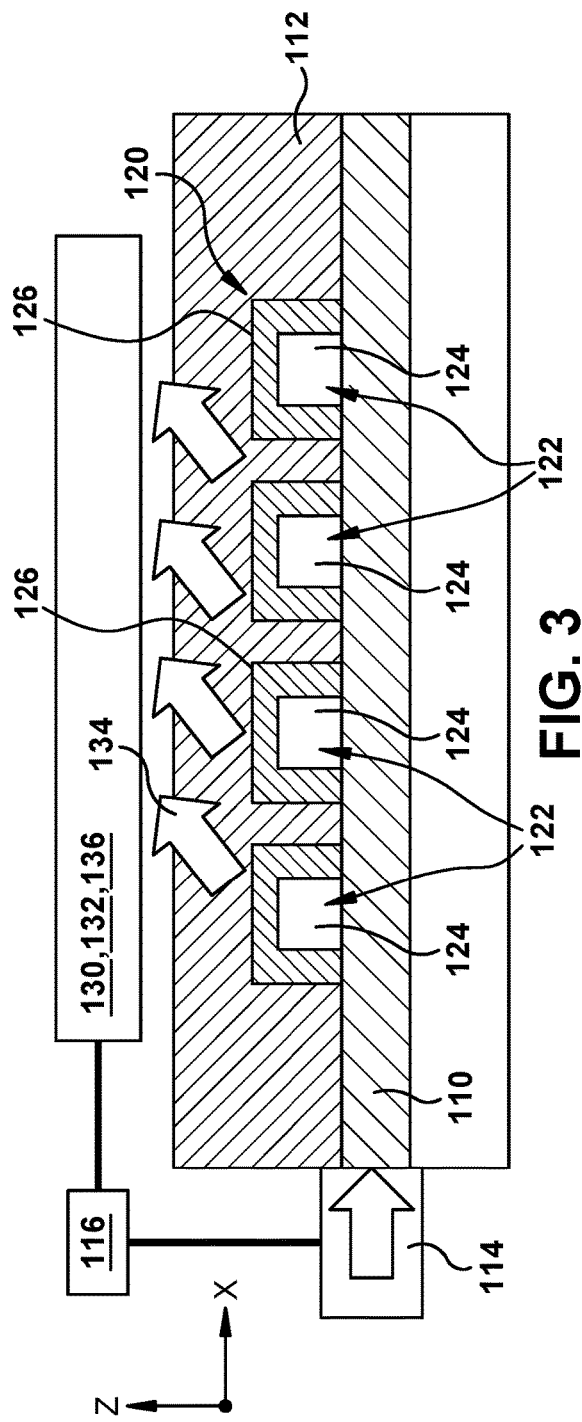
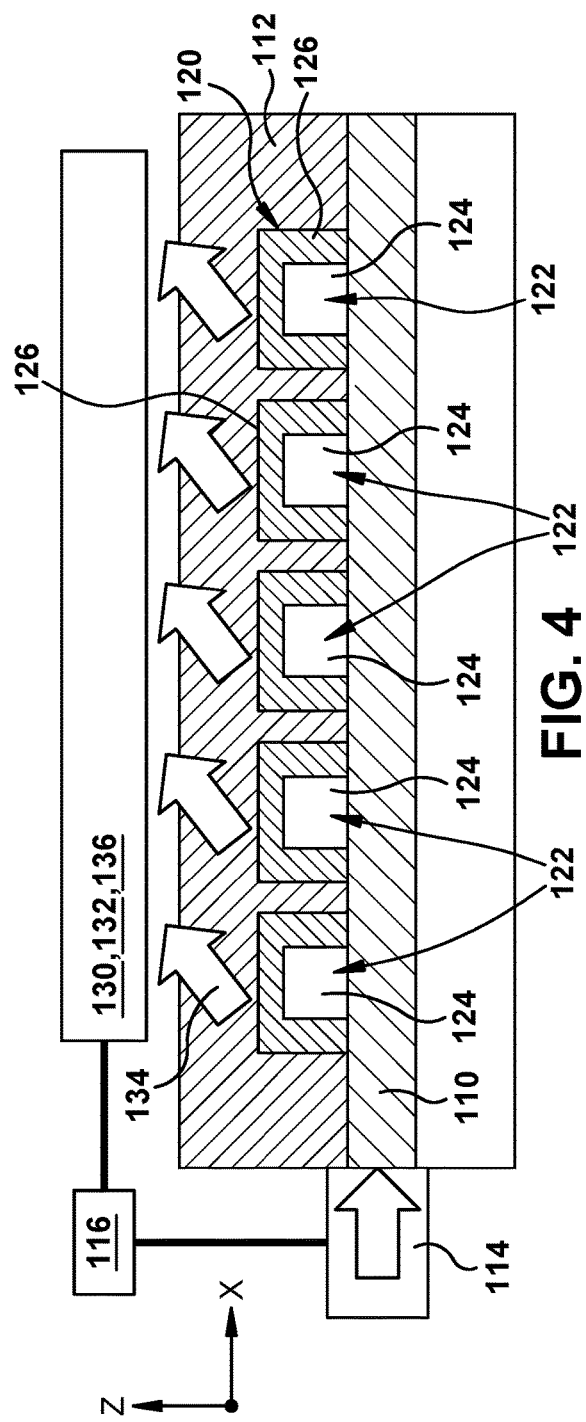

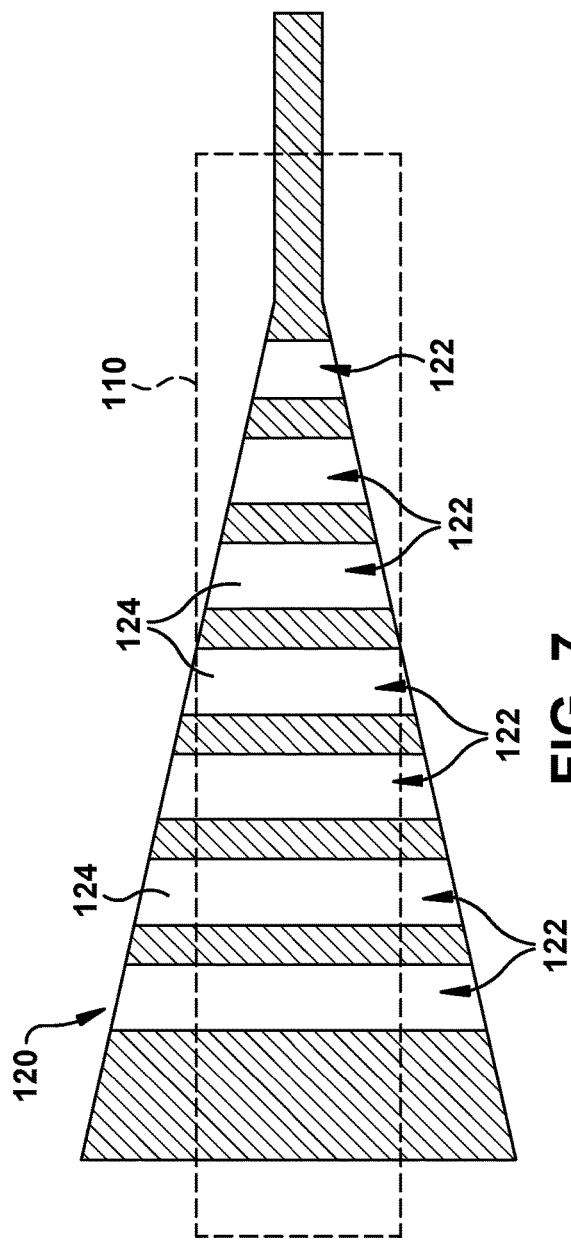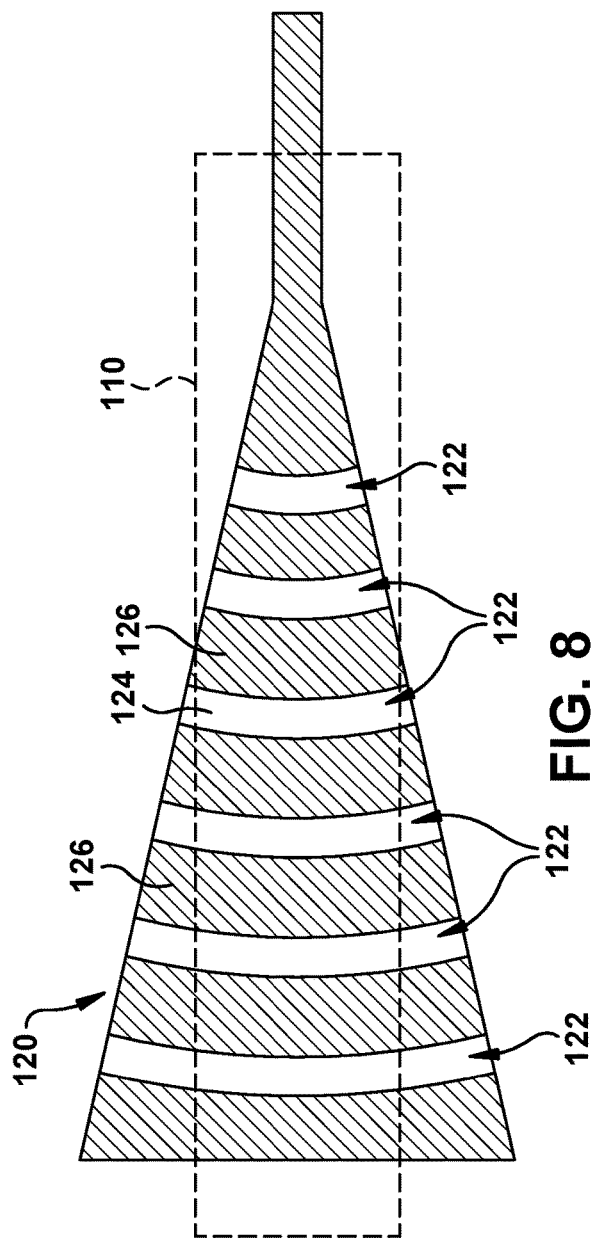

STRUCTURE INCLUDING GRATING COUPLER WITH OPTOFLUIDIC GRATING CHANNELS

BACKGROUND

The present disclosure relates to photonic integrated circuits and, more particularly, to a structure including a grating coupler with a set of optofluidic grating channels for use in, for example, biochemical sensing applications.

Optofluidic systems used in biochemical sensing applications lack the ability to tune their spectrum response, which significantly restricts the applications in analyzing, for example, viruses and deoxyribonucleic acid (DNA) strands.

SUMMARY

All aspects, examples and features mentioned below can be combined in any technically possible way.

An aspect of the disclosure provides a structure comprising: a dielectric waveguide; and at least one grating coupler adjacent the dielectric waveguide, each grating coupler including a set of parallel optofluidic grating channels oriented orthogonally to the dielectric waveguide.

An aspect of the disclosure includes a structure comprising: a dielectric waveguide; a radiation source operatively coupled to the dielectric waveguide; at least one grating coupler adjacent the dielectric waveguide, each grating coupler including a set of optofluidic grating channels oriented orthogonally to the dielectric waveguide; and an optical receiver adjacent the at least one grating coupler.

Another aspect of the disclosure includes any of the preceding aspects, and the set of optofluidic grating channels are parallel to one another.

Another aspect of the disclosure includes any of the preceding aspects, and the set of optofluidic grating channels extend past an edge of the dielectric waveguide.

Another aspect of the disclosure includes any of the preceding aspects, and the set of optofluidic grating channels are non-uniformly spaced from one another.

Another aspect of the disclosure includes any of the preceding aspects, and the set of optofluidic grating channels collectively have a tapered shape in a horizontal plane.

Another aspect of the disclosure includes any of the preceding aspects, and at least a pair of the set of optofluidic grating channels have a curvature in a lengthwise direction thereof.

Another aspect of the disclosure includes any of the preceding aspects, and further comprising an optical waveguide over each of the set of optofluidic grating channels.

Another aspect of the disclosure includes any of the preceding aspects, and each optofluidic grating channel includes an elongated cavity defined partially within a refractive layer, and the dielectric waveguide defines at least one wall of each of the set of optofluidic grating channels.

Another aspect of the disclosure includes any of the preceding aspects, and each optofluidic grating channel extends partially into the dielectric waveguide.

Another aspect of the disclosure includes any of the preceding aspects, and further comprising an input fluid reservoir and an output fluid reservoir, each of the set of optofluidic grating channels in fluid communication with the input fluid reservoir and the output fluid reservoir.

Another aspect of the disclosure includes any of the preceding aspects, and the optical receiver includes a photosensor, and further comprising a signal processing logic operatively coupled to the photosensor.

Another aspect of the disclosure includes any of the preceding aspects, and the dielectric waveguide includes a waveguide splitter, and wherein the at least one grating coupler includes a plurality of grating couplers operatively coupled to the waveguide splitter.

Another aspect of the disclosure includes any of the preceding aspects, and the at least one grating coupler includes a plurality of grating couplers adjacent to the dielectric waveguide, each grating coupler coupled to a different source of fluid.

Another aspect of the disclosure includes any of the preceding aspects, and the at least one grating coupler is vertically between the optical receiver and the dielectric waveguide.

An aspect of the disclosure includes an optofluidic sensing system, comprising: a dielectric waveguide; a radiation source operatively coupled to the dielectric waveguide; at least one grating coupler adjacent the dielectric waveguide, each grating coupler including a set of optofluidic grating channels oriented orthogonally to the dielectric waveguide; an input fluid reservoir and an output fluid reservoir, each of the set of parallel optofluidic grating channels in fluid communication with the input fluid reservoir and the output fluid reservoir; a photosensor adjacent the at least one grating coupler; and a signal processing logic operatively coupled to the photosensor.

Another aspect of the disclosure includes any of the preceding aspects, and the dielectric waveguide includes a waveguide splitter, and wherein the at least one grating coupler includes a plurality of grating couplers operatively coupled to the waveguide splitter.

Another aspect of the disclosure includes any of the preceding aspects, and the set of optofluidic grating channels are non-uniformly spaced.

Another aspect of the disclosure includes any of the preceding aspects, and each optofluidic grating channel includes an elongated cavity defined partially within a refractive layer, and the dielectric waveguide defines at least one wall of each of the set of optofluidic grating channels.

Another aspect of the disclosure includes any of the preceding aspects, and the at least one grating coupler is vertically between the photosensor and the dielectric waveguide.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein:

FIG. 3 shows a cross-sectional view of the system including the grating coupler, according to embodiments of the disclosure.

FIG. 4 shows a cross-sectional view of the system including the grating coupler, according to other embodiments of the disclosure.

FIG. 7 shows a schematic top-down view of a set of optofluidic grating channels of the grating coupler, according to embodiments of the disclosure.

FIG. 8 shows a schematic top-down view of a set of optofluidic grating channels of the grating coupler, according to other embodiments of the disclosure.

Figure 1:
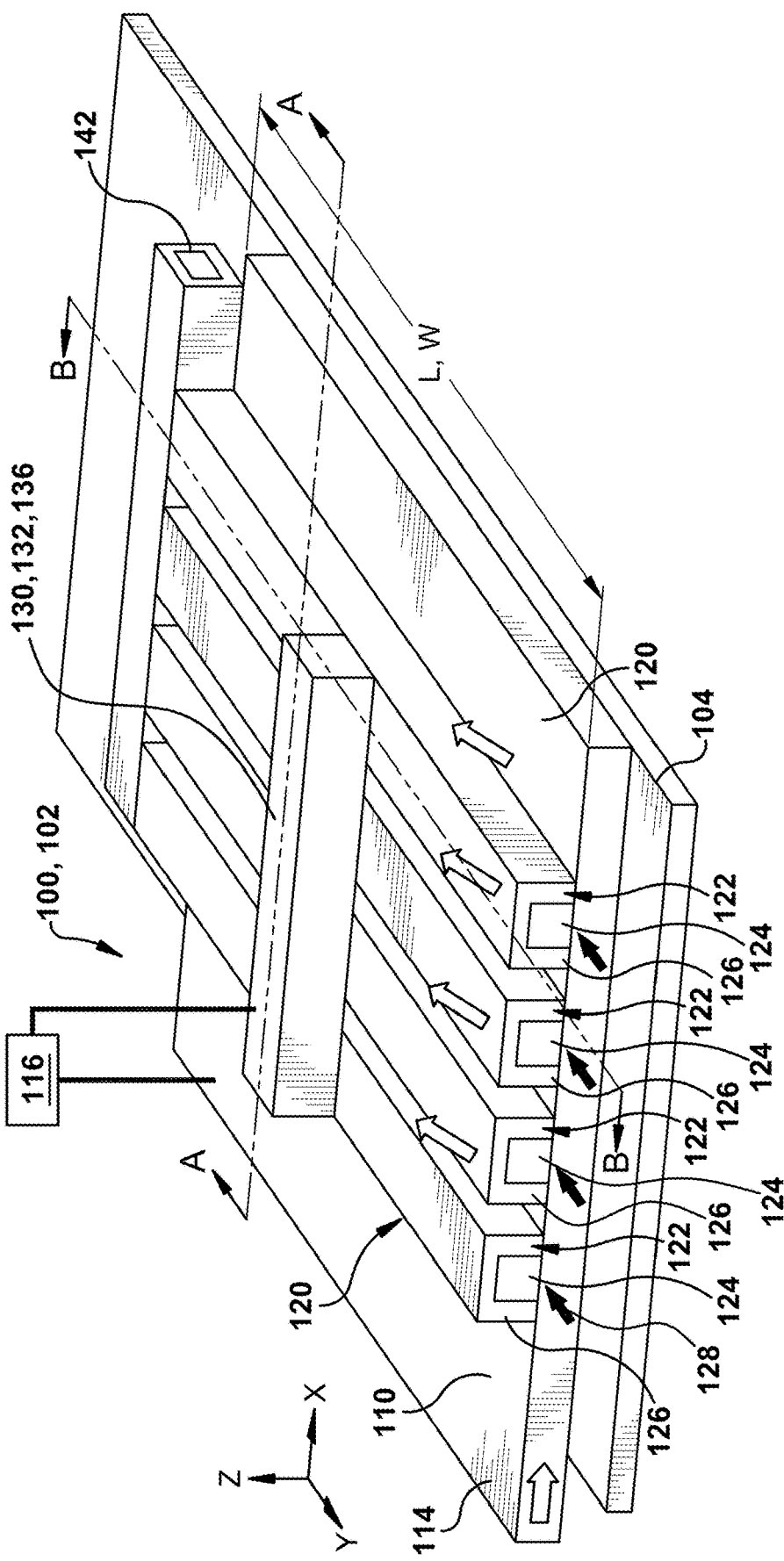
FIG. 1 shows a partially cross-sectional, perspective view of an optofluidic sensing system including a structure having a grating coupler including a set of optofluidic grating channels, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure include a structure including a grating coupler including a set of parallel optofluidic grating channels. The structure may find application, among others, as part of an optofluidic sensing system. The structure includes a dielectric waveguide, and at least one grating coupler adjacent the dielectric waveguide. Each grating coupler includes a set of parallel optofluidic grating channels oriented orthogonally to the dielectric waveguide. The structure may also include a radiation source operatively coupled to the dielectric waveguide, and an optical receiver such as a photosensor adjacent the grating coupler(s). The structure may be used as part of an optofluidic sensor system for, for example, biochemical applications. The optofluidic sensing system may further include a signal processing logic operatively coupled to the photosensor to analyze the optical signal from the grating coupler. The grating channels serve multiple purposes in that they are configured to fluidly communicate a fluid therethrough and collectively form a tunable grating coupler capable of refracting a desired spectrum from an optical signal passed through the fluid in the grating channels.

Figure 2:
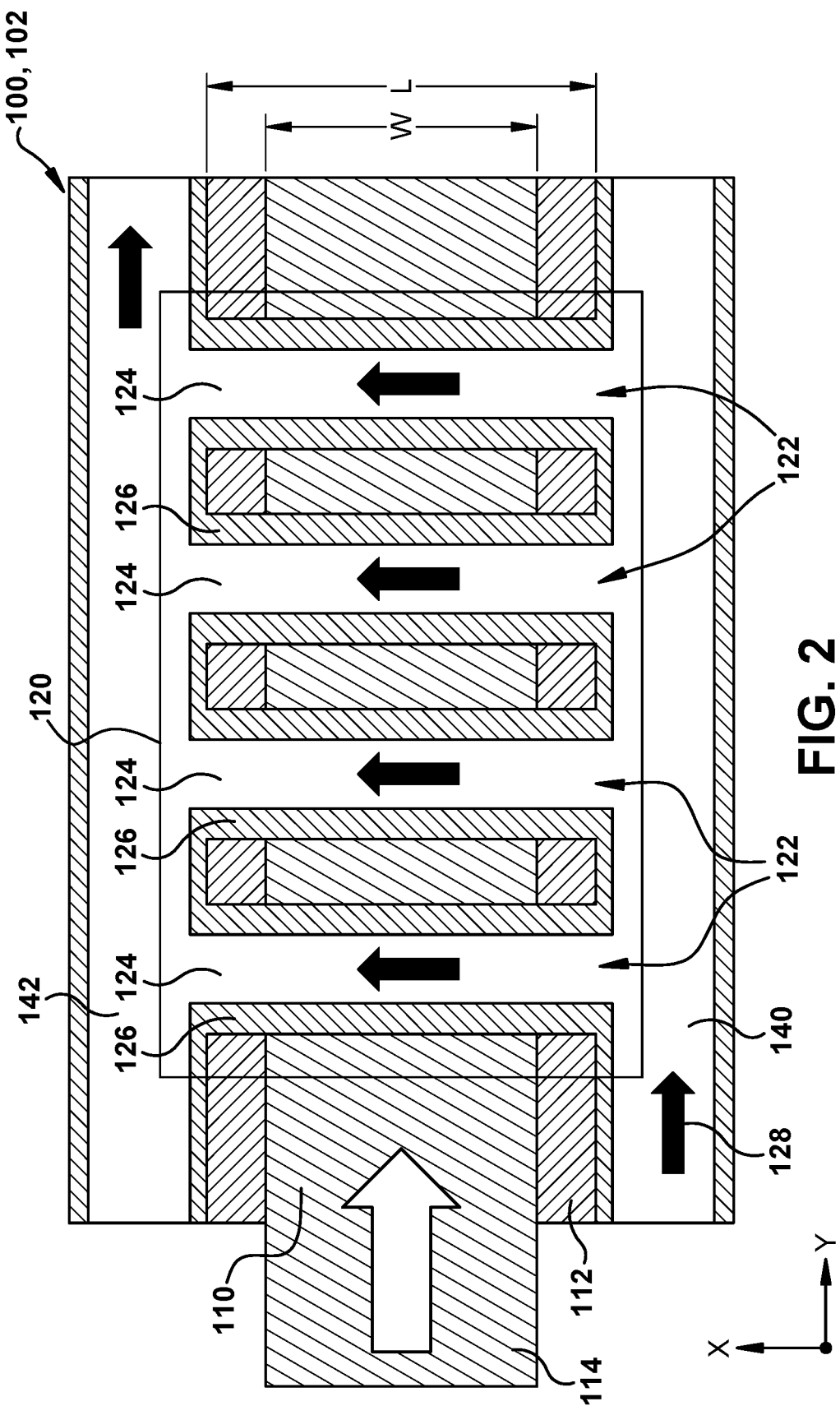
FIG. 2 shows a top-down view of the grating coupler of FIG. 1, according to embodiments of the disclosure.

FIG. 1 shows a partially cross-sectional, perspective view and FIG. 2 shows a top-down view of an optofluidic sensing system 100 including a structure 102, according to embodiments of the disclosure. As will be appreciated by those skilled in the art after a complete reading of the present application, optofluidic sensing system 100 with structure 102 including a grating coupler 120 disclosed herein can be used to analyze samples, e.g., DNA, RNA, virus, proteins, etc. (not shown), that may be present in a fluid 128 as the samples flow through grating channels 122 of structure 102. Fluid 128 is also indicated in the drawings with solid black arrows.

System 102 may be formed on a substrate 104 (FIG. 1), such as any integrated circuit (IC) structure substrate. Structure 102 may be formed using any now known or later developed semiconductor fabrication techniques. Structure 102 may be formed in, for example, any back-end-of-line (BEOL) interconnect layer, e.g., any metal or via layer after a first metal layer of an IC structure. The IC structure may include any other now known or later developed IC devices, e.g., transistors, resistors, capacitors, etc. (not shown).

Structure 102 includes a dielectric waveguide 110. Dielectric waveguide 110 may be formed within any interlayer dielectric (ILD) layer 112, e.g., any BEOL layer. ILD layer 112 may include any now known or later developed ILD material such as but not limited to: silicon dioxide; fluorinated silicate glass (FSG); silicon oxycarbide; SiCOH dielectrics; fluorine doped silicon oxide; spin-on glasses; and any silicon-containing low-k dielectrics. Dielectric waveguide 110 may include any now known or later developed waveguide material such as silicon or silicon nitride. While dielectric waveguide 110 is shown generally as an elongated linear structure, it will be recognized by those with skill in the art that it may have a number of turns and alternative shapes. Dielectric waveguide 110 may be optically coupled to a radiation source 114. Radiation source 114 may direct an optical signal (white arrows), e.g., light, into optical waveguide 144 for use in system 102, as will be described herein. Radiation source 114 provides an optical signal with known and controlled parameters, e.g., wavelength, frequency, etc., and may be controlled by a signal processing logic 116 (see, e.g., FIG. 6) operatively coupled thereto, and described further herein.

Structure 102 also includes at least one grating coupler 120 adjacent dielectric waveguide 110. Each grating coupler 120 includes a set of optofluidic grating channels 122 oriented orthogonally to dielectric waveguide 122. Each optofluidic grating channel 122 (hereafter "grating channel 122") includes an elongated cavity or hollow core 124 (FIG. 5) defined partially in a diffraction layer 126. Diffraction layer 126 may include but is not limited to: a negative photoresist (e.g., SU8), polymer (e.g., polydimethylsiloxane (PDMS)), or any other low to medium refractive index material, e.g., with a refractive index in the range of 1.34 to 2.00. Grating channels 122 serve multiple purposes in that they are configured to fluidly communicate a fluid 128 therethrough and collectively form grating coupler 120. Grating channels 122 are fluidly separated from one another along their lengths. While cavities 124 are shown having a square cross-sectional shape, they may have any shape capable of fluid communication and optical signal refraction, e.g., rectangular (see FIG. 6), circular, oval, etc. Grating channels 122 may be considered "microfluidic" because their geometric scale is such that the surface forces thereof dominate the volumetric forces relative to controlling the fluid 128 passing therethrough. Grating channels 122 being oriented "orthogonally to dielectric waveguide" 122 indicates they extend in a direction perpendicular to a direction of travel of an optical signal in dielectric waveguide 110.

Structure 102 also includes an optical receiver 130 adjacent grating coupler(s) 120. As shown for example in FIGS. 1, 3 and 4, at least one grating coupler 120 is vertically between optical receiver 130 and dielectric waveguide 110. Hence, grating coupler(s) 120 are not in the same plane as optical receiver 130 or dielectric waveguide 110. Optical receiver 130 can take different forms depending on the application of system 100. In certain embodiments, optical receiver 130 may include an optical fiber 132, in which case the optical fiber communicates a diffracted optical signal 134 from grating coupler(s) 120 to another location. Optical fiber 132 may include any now known or later developed optical communication medium, e.g., silicon, silicon nitride, etc. In other embodiments, where system 100 is, for example, an optofluidic sensing system, optical receiver 130 may include a photosensor 136. Photosensor 136 may include any now known or later developed photodetector or photodiode capable of converting diffracted optical signal 134 into an electrical signal, e.g., PIN photodiode or similar structure. Where photosensor 136 is used, system 100 may further include a signal processing logic 116 (hereafter "logic 116") operatively coupled to photosensor 136. Logic 116 may include any now known or later developed complementary metal-oxide semiconductor (CMOS) IC structure for processing an electrical signal from photosensor 136. As noted, logic 116 may control, for example, radiation source 114 and/or photosensor 136.

With further regard to grating channels 122, each set of grating channels 122 may include any number of grating channels 122 sufficient to create the desired grating coupler effect, i.e., refract a predetermined spectrum of an optical signal from dielectric waveguide 110 toward optical receiver 130, creating diffracted optical signal 134. FIGS. 3 and 4 show cross-sectional views (view line A-A, X-Z plane in FIG. 1) of system 100 (some parts removed for clarity) including structure 102. FIG. 3 shows four (4) grating channels 122, and FIG. 4 shows five (5) grating channels 122. While a minimum of 4 or 5 grating channels 122 are shown, it will be recognized that each grating coupler 120 may include more grating channels 122. Set of optofluidic grating channels 122 are (generally) parallel to one another, e.g., within the limits of semiconductor fabrication techniques and perhaps with some curvature.

Figure 5:
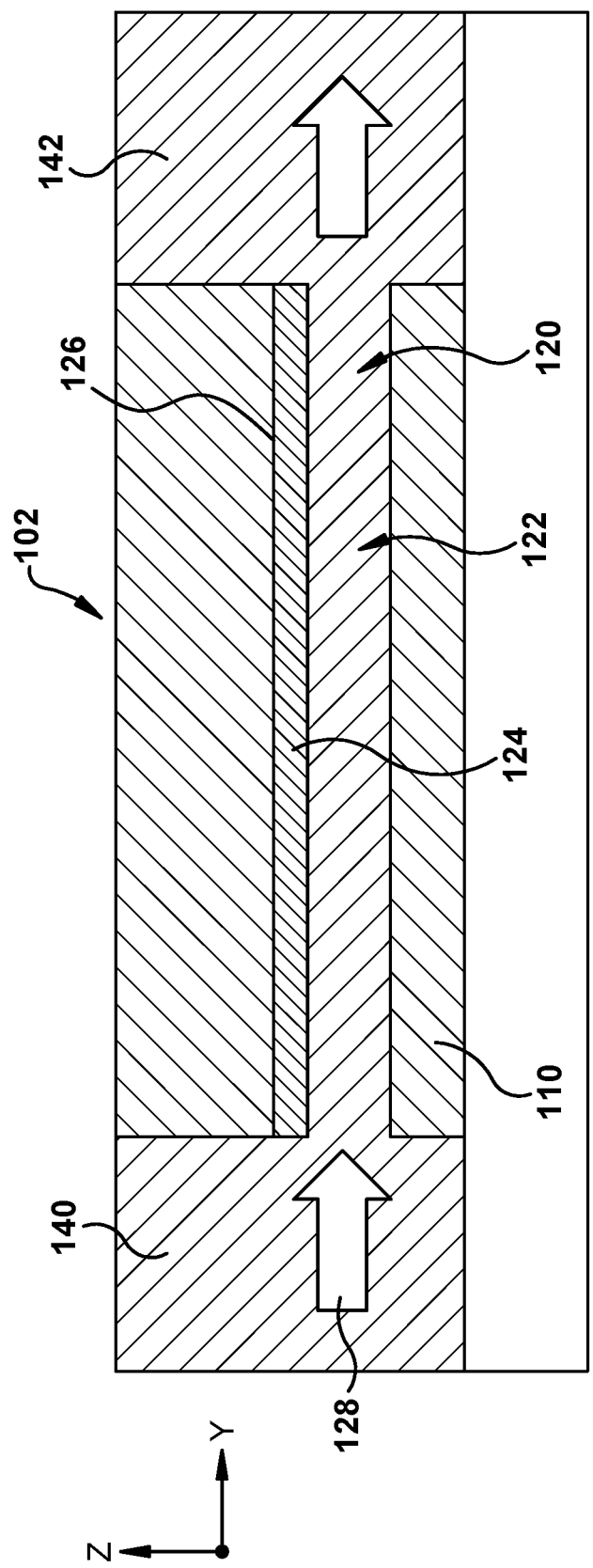
FIG. 5 shows a cross-sectional view of the grating coupler, according to embodiments of the disclosure.

FIG. 5 shows a cross-sectional view of a grating coupler 120 (some parts removed for clarity, view line BB, Y-Z plane of FIG. 1). As shown in FIGS. 2 and 5, structure 102 may also include an input fluid reservoir 140 and an output fluid reservoir 142. Each channel 122 is in fluid communication with input fluid reservoir 140 and output fluid reservoir 142, i.e., at ends thereof. A fluid 128 to be analyzed can be communicated into input fluid reservoir 140, through grating channels 122 and to output fluid reservoir 142. Energy for causing the movement of fluid 128 and any samples therein from input fluid reservoir 140 through grating channels 122 to output fluid reservoir 142 may be provided by a variety of known systems and techniques, e.g., known pumping systems, known systems that employ capillary forces as the motive force for fluid 22, known systems employing known electrophoretic forces, etc. The physical size of input fluid reservoir 140 and output fluid reservoir 142 may vary depending upon the particular application. Fluid 128 may be any suitable type of liquid, e.g., buffer, pH buffer, Tris buffer, Tris EDTA (ethylenediaminetetraacetic acid) buffer, etc. As noted above, in one illustrative embodiment, fluid 128 may contain samples, which can include biological materials, e.g., DNA, a virus, proteins, etc. In other applications, fluid 128 may be substantially free of any particles or materials.

Grating channels 122 can be arranged relative to each other to generate a desired refractive action within each set, generating a desired diffracted optical signal 134. Where more than one set of grating channels 122 are employed, the sets can have the same or different spacings. In FIGS. 1-3, grating channels 122 are uniformly spaced. That is, they are periodically or equidistantly spaced from one another. In contrast, in other embodiments, as shown in FIG. 4, grating channels 122 are non-uniformly spaced from one another, i.e., they are aperiodically spaced. In this manner, each grating coupler 122 can be customized to refract an optical signal from dielectric waveguide 110 in a desired fashion, creating diffracted optical signal 134.

Figure 6:
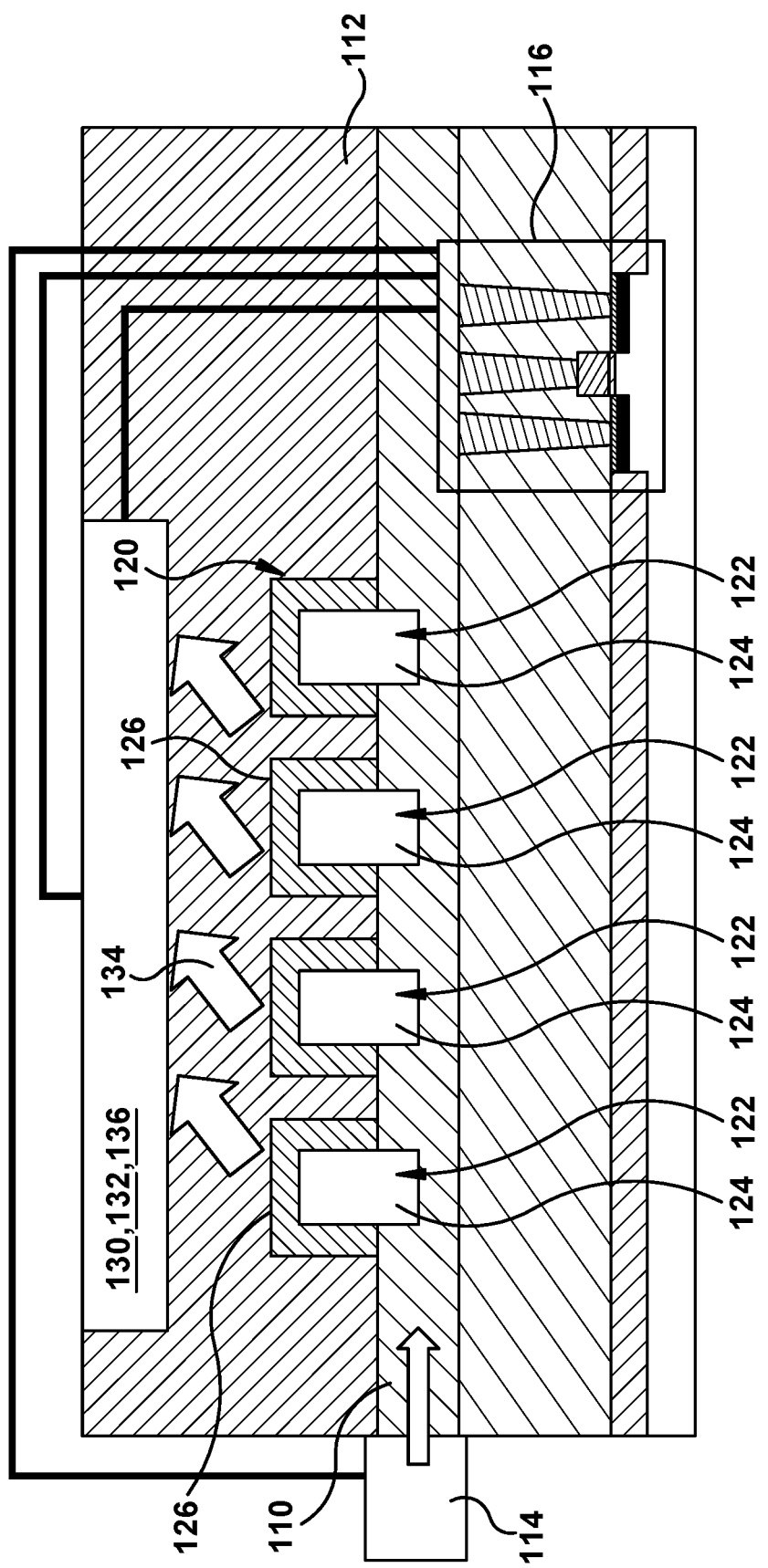
FIG. 6 shows a schematic cross-sectional view of the system including the grating coupler, according to additional embodiments of the disclosure.

Grating channels 122 can also have a shape and/or size of their cavities 124 configured to generate a desired refractive action within each channel, which provides further customization of diffracted optical signal 134. As noted, channels 122 are formed (at least) partially by diffraction layer 126. In FIGS. 1, 3 and 4, channels 122 are generated on three sides by diffraction layer 126, e.g., with a top wall and side wall thereof formed by diffraction layer 126, and a bottom wall thereof provided by dielectric waveguide 110. Hence, dielectric waveguide 110 defines at least one wall of each of the set of optofluidic grating channels 122, i.e., each channel. FIG. 6 shows a schematic cross-sectional view of system 100 including structure 102, according to additional embodiments of the disclosure. In FIG. 6, dielectric waveguide 110 defines more than one wall of each channel 122. In the example shown, dielectric waveguide 110 provides three partial side walls of a bottom portion of each channel 122. Hence, in this example, each optofluidic grating channel 122 extends partially into dielectric waveguide 110. In the example shown, grating channels 122 are rectangular, but that is not necessary in all cases.

Referring again to FIGS. 1, 2, 7 and 8, the lengths and/or longitudinal shapes of each grating channel 122 can also be configured to customize diffracted optical signal 134. In FIG. 1, set of optofluidic grating channels 122 have a length L that matches a width W of dielectric waveguide 110. In FIG. 2, set of optofluidic grating channels 122 extend past an edge of dielectric waveguide 110. That is, a length L of channels 122 is greater than a width W of dielectric waveguide 110. FIGS. 7 and 8 show schematic top-down views of a set of optofluidic grating channels 122, according to various other embodiments of the disclosure. In FIGS. 7 and 8, set of grating channels 122 collectively have a tapered shape in a horizontal plane. In this example, set of grating channels 122 collectively have a funnel shape with each sequential grating channel 122 having a shorter length, i.e., left to right on the page. In certain embodiments, grating channels 122 may be linear. In other embodiments, as shown in FIG. 8, at least a pair of the set of optofluidic grating channels 122 may have a curvature in a longitudinal extent thereof. The number of grating channels 122 including the curvature and the radius of the curvature can be selected to obtain the desired effect on diffracted optical signal 134. In any event, grating channels 122 remain generally orthogonal to dielectric waveguide 110 (dashed box in FIGS. 7 and 8) and the optical signal being communicated therein.

Figure 9:
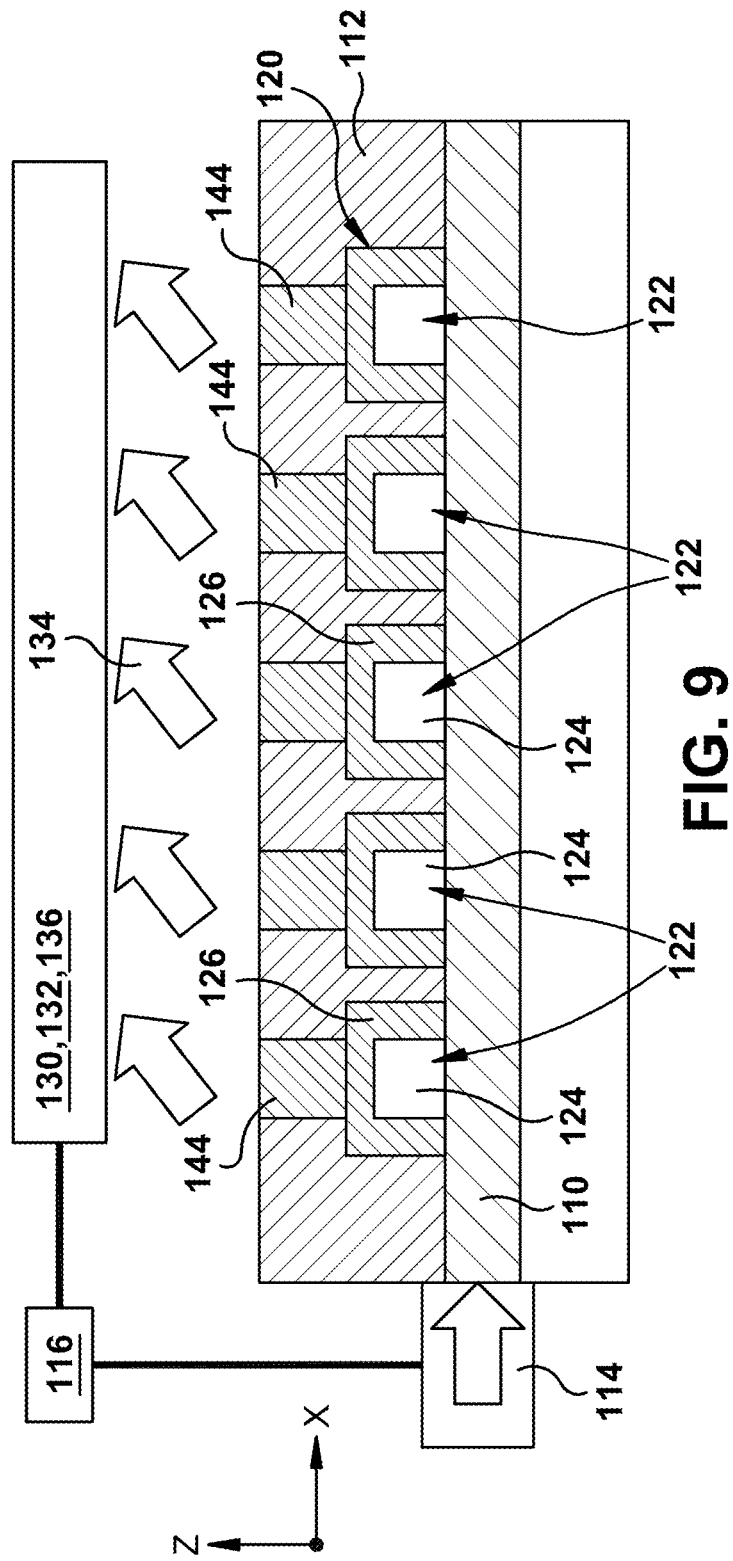
FIG. 9 shows a cross-sectional view of the system including the grating coupler, according to other embodiments of the disclosure.

An exterior surface of grating channels 122 can also be configured to customize diffracted optical signal 134. FIG. 9 shows a cross-sectional view of structure 102, according to other embodiments of the disclosure. Diffraction layer 126 may have an exterior surface thereof shaped in any manner to create the desired diffracted optical signal 134. For example, it can have a cubical exterior a shown in, for example, FIGS. 1, 3, and 4. FIG. 9 shows an embodiment in which an optical waveguide 144 is positioned over each of the set of optofluidic grating channels 122. Optical waveguide 144 may include any waveguide material, e.g., silicon or silicon nitride, or may include the same material as diffraction layer 126 (as shown).

Figure 10:
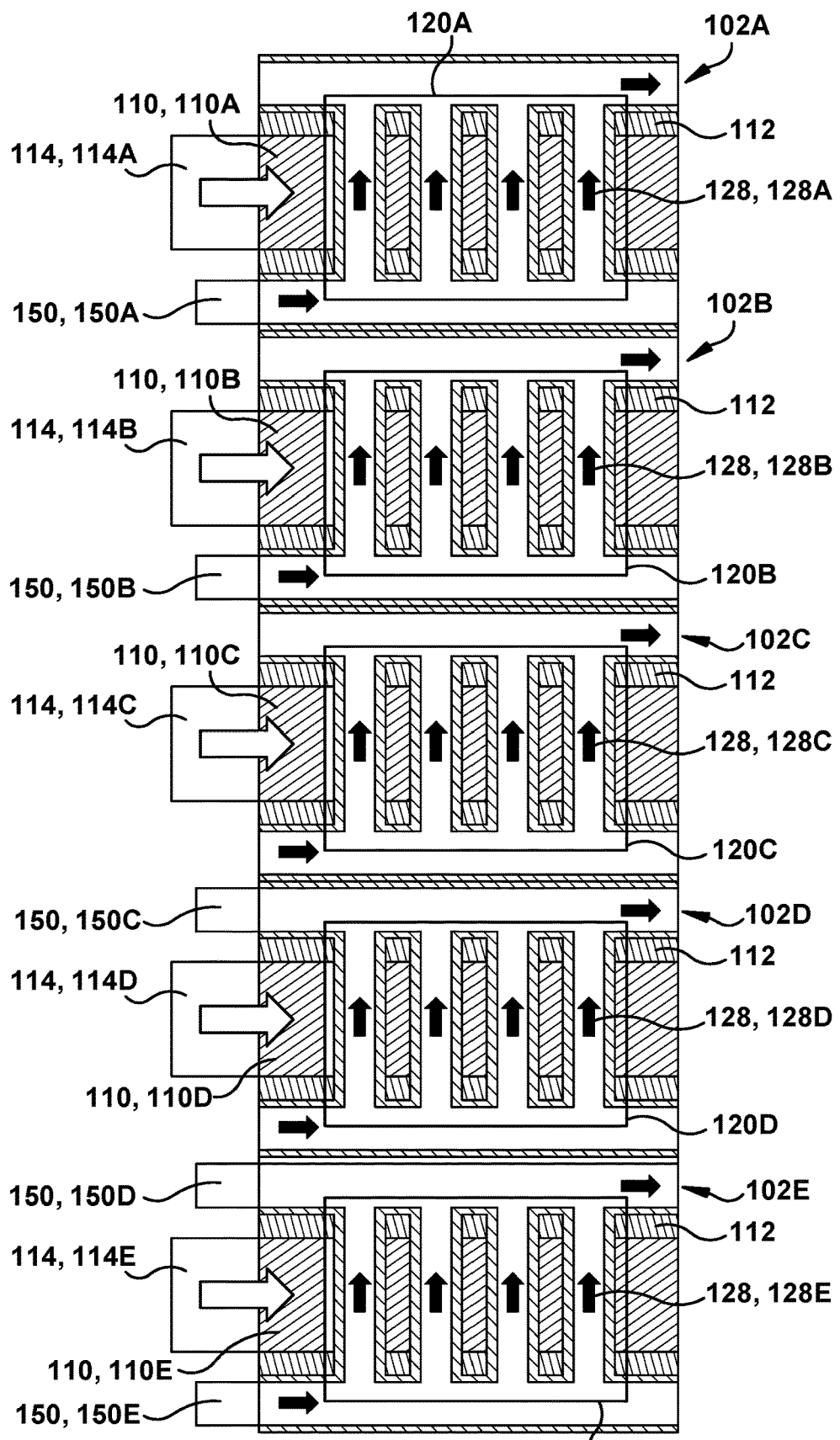
FIG. 10 shows a schematic top-down view of the system including a plurality of the structures including a grating coupler, according to additional embodiments of the disclosure.

FIGS. 1-9 each illustrate a single grating coupler 120 for a particular system 100. However, any number of structures 102 including grating couplers 120 may be used within a single system 100 according to embodiments of the disclosure. FIG. 10 shows a schematic top-down view of system 100 including a plurality of structures 102A-E, each including a respective grating coupler 120A-E, according to additional embodiments of the disclosure. This arrangement enables many options for operation of system 100. In one embodiment, a plurality of grating couplers 120A-E is shown adjacent to dielectric waveguide 110, and each grating coupler 120A-E is coupled to a different source of fluid 150A-E (coupled to input fluid reservoir 140 (FIG. 2)). In this manner, a variety of fluids can be evaluated using the same optical signal, i.e., radiation source 114 provides the same optical signal to each grating coupler 120-E. In another embodiment, a plurality of grating couplers 120A-E is shown adjacent to dielectric waveguide 110A-E, and each grating coupler 120A-E is adjacent dielectric waveguide 110A-E coupled to a different radiation source 114A-E (or same radiation source with a number of different outputs). In this manner, a single fluid can be evaluated using different optical signals, i.e., radiation sources 114A-E provide different optical signals to each grating coupler 120A-E. In another embodiment, several fluids can be evaluated using different optical signals. That is, different radiation sources (or outputs) 114A-E with different optical signals can be used with different fluids 128A-E. In addition to the above-described variations, each grating coupler 120A-E can also be customized to create a desired diffracted optical signal 134, providing additional ways to customize operation of system 100. While five different systems 102A-E are shown in FIG. 10, any number can be provided in the manner described.

Figure 11:
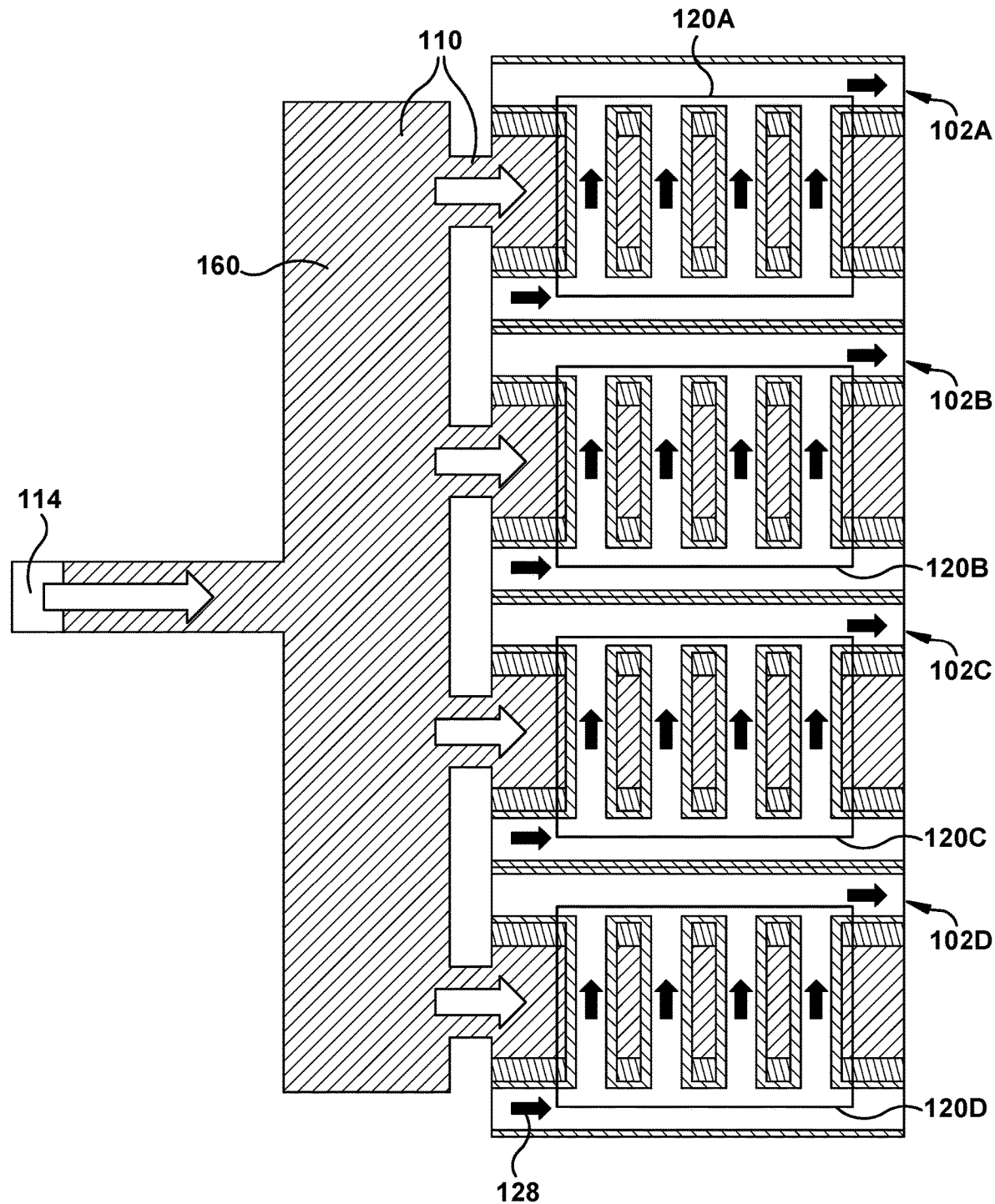
FIG. 11 shows a schematic top-down view of the system including a plurality of the structures including the grating coupler, according to additional embodiments of the disclosure.

FIG. 11 shows a schematic top-down view of the system including a plurality of the structures 102A-D each including a grating coupler 120A-D, according to additional embodiments of the disclosure. In this embodiment, dielectric waveguide 110 includes a waveguide splitter 160, and a plurality of grating couplers 120A-D are operatively coupled to waveguide splitter 160. Waveguide splitter 160 may include any now known or later developed splitter structure capable of distributing an optical signal to different locations, such as but not limited to a multimode interferometer (MMI). In this manner, a single or multiple fluids can be evaluated using a single radiation source 114. While four different systems 102A-E are shown in FIG. 11, any number can be provided in the manner described.

Figure 12:
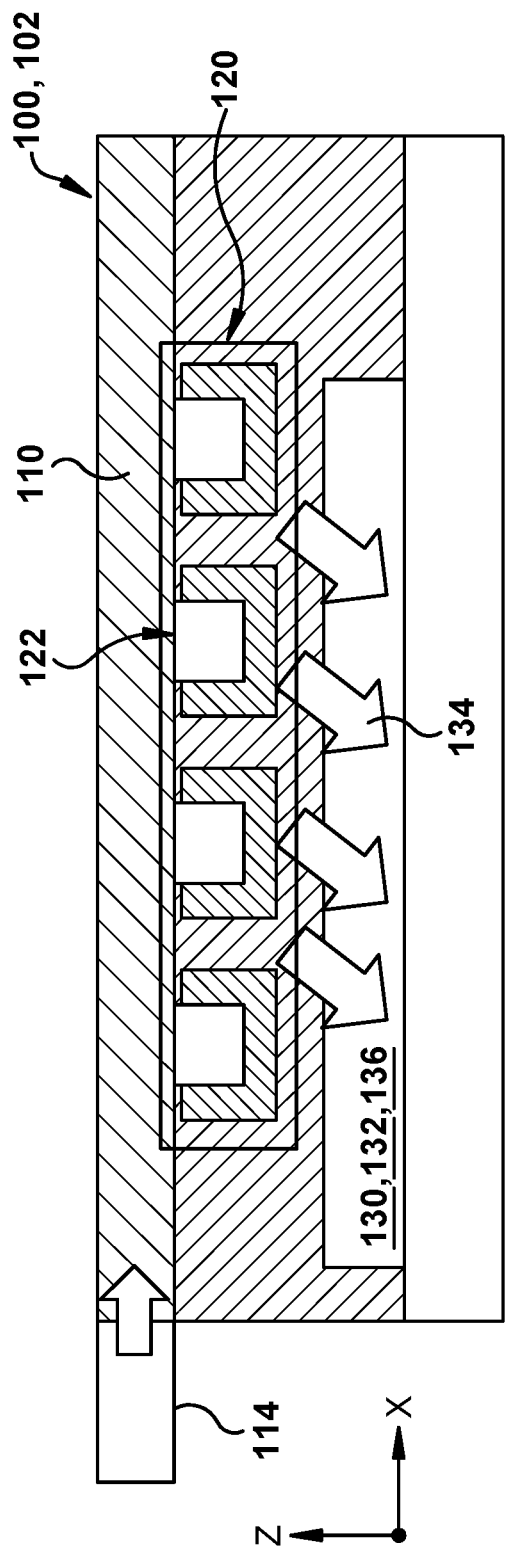
FIG. 12 shows a cross-sectional view of the system including the grating coupler, according to an alternative embodiment of the disclosure.

While the drawings illustrate grating coupler 120 with dielectric waveguide 110 below and optical receiver 130 above, it will be recognized that the positions of dielectric waveguide 110 and optical receiver 130 may be switched. FIG. 12 shows a cross-sectional view in which the positions are switched. Here, dielectric waveguide 110 is above grating coupler 120 and optical receiver 130 is below grating coupler 120.

In operation, system 100 can be used to analyze samples, e.g., DNA, RNA, virus, proteins, etc., that may be present in fluid 128 as the sample flows through grating coupler(s) 120. In one illustrative example, system 100 can be used to measure a photon count of a fluorescence signal of a sample as excited by radiation source(s) 114 via dielectric waveguide 110 and diffracted by grating coupler 120, and compare that measured value to a reference value, e.g., using logic 116. Logic 116 can control radiation source(s) 114 and/or photosensor(s) 136 in any manner. Typically, during the process of analyzing the samples, fluid 128 can be held in an approximate steady state condition and samples contained within fluid 128 (DNA, RNA, virus, proteins, etc.) can be moved from input fluid reservoir 140, through grating channels 122 of grating coupler 120 to output fluid reservoir 142 using, for example, electrostatic forces by mechanisms that are known to those skilled in the art. As shown in just FIG. 6 for clarity, electrical contacts can be made from optical receiver 130 in the form of photosensor 136 to logic 116. As the samples pass through grating coupler 120, the samples can interact with radiation from radiation source 114 passing through grating channels 122 from dielectric waveguide 110. The input optical signal can enter grating channels 122 after being conveyed from radiation source 114 through dielectric waveguide 110. After passing through grating channels 122, diffracted optical signal 134 is received by optical receiver 130. Diffracted optical signal 134 can include any spectrum desired to be formed from the input optical signal after passing through fluid 128 by customization of grating coupler 120, as described herein.

Where photosensor 136 is used, logic 116 can be used to analyze diffracted optical signal 134 in any now known or later developed manner. For example, system 100 can detect and monitor the refractive index change of fluid 128 associated with DNA or a virus. That is, grating coupler 120 response (spectrum) will change according to fluids 128 therein (e.g., spectrum/peak wavelength position or shift, insertion loss and/or shape of the response, as well as bandwidth). Spectrum changes based on fluid 128, e.g., a blue shift to shorter wavelength or red shift to longer wavelength, may be used to analyze fluid 128 and contents thereof. Grating coupler 120 can be optimized for different operational wavelengths (e.g., visible, near-infrared, mid-infrared, etc.).

Embodiments of the disclosure provide various technical and commercial advantages, examples of which are discussed herein. System 100 provides a compact and low cost optofluidic biochemical sensor solution. Grating coupler 120 serves a dual purpose of fluid transport and an optical detection unit (with photosensor 136). System 100 enables wafer-level measurement and monitoring of biochemical samples and enables monolithic CMOS integration for signal processing. System 100 also enables a high throughput.

The system and structure as described above may be used in the fabrication of photonic integrated circuit (PIC) chips. The resulting PIC chips can be distributed by the fabricator in raw wafer form (that is, as a single wafer that has multiple unpackaged chips), as a bare die, or in a packaged form. In the latter case the PIC chip is mounted in a single chip package (such as a plastic carrier, with leads that are affixed to a motherboard or other higher-level carrier) or in a multichip package (such as a ceramic carrier that has either or both surface interconnections or buried interconnections). In any case the PIC chip is then integrated with other chips, discrete circuit elements, and/or other signal processing devices as part of either (a) an intermediate product, or (b) an end product, such as a complete optofluidic sensor system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure comprising:
   a dielectric waveguide; and
   at least one grating coupler adjacent the dielectric waveguide, each grating coupler including a set of parallel optofluidic grating channels oriented orthogonally to the dielectric waveguide, wherein each of the set of parallel optofluidic grating channels is fluidly enclosed within the dielectric waveguide and a refractive layer coupled to the dielectric waveguide, the dielectric waveguide defining an upper surface and sidewalls of each of the set of optofluidic grating channels.

2. The structure of claim 1, wherein a length dimension of the set of optofluidic grating channels is greater than a width dimension of the dielectric waveguide.

3. The structure of claim 1, wherein the set of optofluidic grating channels collectively have a tapered shape in a horizontal plane.

4. A structure comprising:
   a refractive layer including a plurality of discrete sections;
   a dielectric waveguide;
   a radiation source operatively coupled to the dielectric waveguide;
   at least one grating coupler adjacent the dielectric waveguide, each grating coupler including a set of optofluidic grating channels oriented orthogonally to the dielectric waveguide, each optofluidic grating channel including a hollow core defined by and fluidly enclosed within the dielectric waveguide and the refractive layer, wherein the dielectric waveguide defines an upper surface and sidewalls of each of the set of optofluidic grating channels; and
   an optical receiver adjacent the at least one grating coupler.

5. The structure of claim 4, wherein the set of optofluidic grating channels are parallel to one another.

6. The structure of claim 4, wherein a length dimension of the set of optofluidic grating channels is greater than a width dimension of the dielectric waveguide.

7. The structure of claim 4, wherein the set of optofluidic grating channels are spaced from one another by a distance different than a width dimension of one optofluidic grating channel of the set of optofluidic grating channels.

8. The structure of claim 4, wherein the set of optofluidic grating channels collectively have a tapered shape in a horizontal plane.

9. The structure of claim 8, wherein at least a pair of the set of optofluidic grating channels have a curvature in a lengthwise direction thereof.

10. The structure of claim 4, further comprising an optical waveguide over each of the set of optofluidic grating channels.

11. The structure of claim 4, wherein each optofluidic grating channel extends partially into the dielectric waveguide.

12. The structure of claim 4, further comprising an input fluid reservoir and an output fluid reservoir, each of the set of optofluidic grating channels in fluid communication with the input fluid reservoir and the output fluid reservoir.

13. The structure of claim 4, wherein the optical receiver includes a photosensor, and further comprising a signal processing logic operatively coupled to the photosensor.

14. The structure of claim 4, wherein the dielectric waveguide includes a waveguide splitter, and wherein the at least one grating coupler includes a plurality of grating couplers operatively coupled to the waveguide splitter.

15. The structure of claim 4, wherein the at least one grating coupler includes a plurality of grating couplers adjacent to the dielectric waveguide, each grating coupler coupled to a different source of fluid.

16. The structure of claim 4, wherein the at least one grating coupler is vertically between the optical receiver and the dielectric waveguide.

17. An optofluidic sensing system, comprising:
a dielectric waveguide;
a refractive layer including a plurality of discrete sections;
a radiation source operatively coupled to the dielectric waveguide;
at least one grating coupler adjacent the dielectric waveguide, each grating coupler including a set of optofluidic grating channels oriented orthogonally to the dielectric waveguide, each optofluidic grating channel including a hollow core defined by and fluidly enclosed within the dielectric waveguide and the refractive layer, wherein the dielectric waveguide defines an upper surface and sidewalls of each of the set of optofluidic grating channels;
an input fluid reservoir and an output fluid reservoir, each of the set of parallel optofluidic grating channels in fluid communication with the input fluid reservoir and the output fluid reservoir such that each optofluidic grating channel transmits a respective portion of fluid from the input fluid reservoir to the output fluid reservoir;
a photosensor adjacent the at least one grating coupler; and
a signal processing logic operatively coupled to the photosensor.

18. The system of claim 17, wherein the dielectric waveguide includes a waveguide splitter, and wherein the at least one grating coupler includes a plurality of grating couplers operatively coupled to the waveguide splitter.

19. The system of claim 17, wherein the set of optofluidic grating channels are spaced from one another by a distance different than a width dimension of one optofluidic grating channel of the set of optofluidic grating channels.

20. The system of claim 17, wherein the at least one grating coupler is vertically between the photosensor and the dielectric waveguide.

* * * * *